United States Patent
Neff et al.

(10) Patent No.: US 6,424,464 B1
(45) Date of Patent: *Jul. 23, 2002

(54) METHOD AND APPARATUS FOR INTERACTIVE CURVED SURFACE SEISMIC INTERPRETATION AND VISUALIZATION

(75) Inventors: Dennis B. Neff; John R. Grismore; William A. Lucas; Jacquelyn K. Singleton, all of Bartelsville; Jesse E. Layton, Ochelata; Steven B. Wyatt, Bartlesville, all of OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/698,678

(22) Filed: Oct. 27, 2000

Related U.S. Application Data

(63) Continuation-in-part of application No. 09/306,611, filed on May 6, 1999, now Pat. No. 6,215,499, and a continuation-in-part of application No. 09/306,612, filed on May 6, 1999, now Pat. No. 6,188,517.

(51) Int. Cl.[7] .................... G03B 21/56; G03B 21/60; G03B 21/00; G06T 15/00; G01V 1/00
(52) U.S. Cl. .................. 359/451; 359/458; 345/419; 367/38; 367/70; 367/72; 353/7
(58) Field of Search .............................. 345/418, 419, 345/420; 367/38, 70, 72; 359/443, 451, 458; 353/7

(56) References Cited

U.S. PATENT DOCUMENTS

| | | | | |
|---|---|---|---|---|
| 3,836,812 A | * | 9/1974 | Bennett .................... 315/364 |
| 3,983,474 A | | 9/1976 | Kulpers .................... 324/43 |
| 4,017,858 A | | 4/1977 | Kulpers .................... 343/100 |
| 4,350,489 A | * | 9/1982 | Gdovin .................... 434/40 |
| 4,467,461 A | * | 8/1984 | Rice et al. .................... 367/70 |
| 4,633,448 A | * | 12/1986 | Koeijmans .................... 367/72 |
| 4,661,935 A | * | 4/1987 | Shock et al. .................... 367/70 |
| 4,766,498 A | | 8/1988 | Spruit .................... 358/237 |
| 4,809,240 A | * | 2/1989 | Mufti .................... 367/72 |
| 4,876,673 A | * | 10/1989 | McCowan .................... 367/68 |
| 5,181,181 A | * | 1/1993 | Glynn .................... 702/141 |
| 5,307,072 A | | 4/1994 | Jones, Jr. .................... 342/147 |
| 5,355,146 A | | 10/1994 | Chiu et al. .................... 345/156 |
| 5,453,686 A | | 9/1995 | Anderson .................... 324/207.17 |
| 5,483,254 A | * | 1/1996 | Powell .................... 345/87 |
| 5,502,481 A | * | 3/1996 | Dentinger .................... 348/51 |
| 5,540,229 A | * | 7/1996 | Collet-Billon et al. .................... 600/443 |
| 5,570,106 A | * | 10/1996 | Viswanathan .................... 345/856 |
| 5,640,170 A | | 6/1997 | Anderson .................... 343/895 |
| 5,717,455 A | * | 2/1998 | Kamewada .................... 348/85 |
| 5,762,413 A | * | 6/1998 | Colucci et al. .................... 353/122 |
| 5,908,300 A | * | 6/1999 | Walker et al. .................... 434/43 |
| 5,982,352 A | | 11/1999 | Pryor .................... 345/156 |
| 6,028,606 A | * | 2/2000 | Kolb et al. .................... 345/433 |
| 6,031,538 A | * | 2/2000 | Chupeau et al. .................... 345/419 |
| 6,078,351 A | * | 6/2000 | Hall, Jr. et al. .................... 345/419 |
| 6,081,269 A | * | 6/2000 | Quarendon .................... 345/419 |
| 6,084,587 A | * | 7/2000 | Tarr et al. .................... 345/419 |
| 6,188,517 B1 | * | 2/2001 | Neff et al. .................... 359/451 |
| 6,215,499 B1 | * | 4/2001 | Neff et al. .................... 345/419 |

* cited by examiner

*Primary Examiner*—Christopher Mahoney
*Assistant Examiner*—Magda Cruz
(74) *Attorney, Agent, or Firm*—Ryan N. Cross

(57) ABSTRACT

An enlarged computer graphic image of seismic data is displayed on a concave three-dimensional surface having a shape corresponding to the shape of selected data extracted from a three-dimensional seismic volume. Thus providing an enlarged image of a seismic surface where the data is spatially correct in three-dimensions, and which increases the ease with which interpreters can locate geological features such as horizons, faults, and channels. An auxiliary paddle screen is provided to display an interactive video image for exploring the volume within the hybrid screen.

20 Claims, 12 Drawing Sheets

METHOD AND APPARATUS FOR INTERACTIVE CURVED SURFACE SEISMIC INTERPRETATION AND VISUALIZATION

This application is a continuation-in-part of application Ser. No. 09/306,611, filed May 6, 1999, now U.S. Pat No. 6,215,499 B1, issued Apr. 10, 2001, and application Ser. No. 09/306,612, filed May 6, 1999, now U.S. Pat. No. 6,188,517 B1, issued Feb. 13, 2001.

This invention relates to a method and apparatus for projecting spatially correct seismic data onto a large three-dimensional (3D) curved display surface, to aid in interpretation of geological characteristics of the earth. More specifically, this invention relates to a method for projecting computer graphic video images of seismic data onto a large curved 3D display surface, allowing viewers to interact with the 3D display, and to use their peripheral vision, and thus perceive the displayed imagery with a sense of realism comparable with natural viewing of a 3D physical reality.

BACKGROUND OF THE INVENTION

For many years seismic exploration for oil and gas has involved the use of a source of seismic energy and its reception by an array of seismic detectors, generally referred to as geophones. When used on land, the source of seismic energy can be a high explosive charge electrically detonated in a borehole located at a selected point on the terrain, or another energy source having capacity for delivering a series of impacts or mechanical vibrations to the earth's surface. Offshore, air gun sources and hydrophone receivers are commonly used. The acoustic waves generated in the earth by these sources are reflected back from strata boundary and/or other discontinuities and reach the earth's surface at varying intervals of time, depending on the distance traversed and the characteristics of the subsurface traversed. On land these returning waves are detected by the geophones, which function to transduce such acoustic waves into representative electrical analog signals, which are generally referred to as traces. In use on land an array of geophones is generally laid out along a grid covering an area of interest to form a group of spaced apart observation stations within a desired locality to enable construction of three-dimensional views of reflector positions over wide areas. The source, which is offset a desired distance from the geophones, injects acoustic signals into the earth, and the detected signals at each geophone in the array are recorded for later processing using digital computers, where the analog data is generally quantized as digital sample points, e.g., one sample every two milliseconds, such that each sample point may be operated on individually. The geophone array is then moved to a new position and the process is repeated to obtain a 3D data volume for a seismic survey.

After exploration of an area is completed, data relating to energy detected at a plurality of geophones will have been recorded, where the geophones are located at varying distances from the shotpoint. The data is then reorganized to collect traces from data transmitted at various shotpoints and recorded at various geophone locations, where the traces are grouped such that the reflections can be assumed to have been reflected from a particular point within the earth, i.e., a common midpoint. The individual records or "traces" are then corrected for the differing distance the seismic energy travels through the earth from the corresponding shotpoints, to the common midpoint, and upwardly to the various geophones. This step includes correction for the varying velocities through rock layers of different types and changes in the source and receiver depths. The correction for the varying spacing of shotpoint/geophone pairs is referred to as "normal move out." After this is done, the group of signals from the various midpoints are summed. Because the seismic signals are of a sinusoidal nature, the summation process serves to reduce noise in the seismic record, and thus increasing its signal-to-noise ratio. This process is referred to as the "stacking" of common midpoint data, and is well known to those skilled in the art. Accordingly, seismic field data undergoes the above-mentioned corrections, and may also undergo migration, which is an operation on uninterpreted data and involves rearranging of seismic information so that dipping horizons are plotted in their true location. Other more exotic known processing techniques may also be applied, which for example enhance faults and stratigraphic features or some other attribute, before the continuously recorded traces are reduced to vertical or horizontal cross sections or horizontal map views which approximate subsurface structure, and are usually in color.

Once the seismic data is satisfactorily processed to incorporate necessary corrections and desired enhancements, the geophysicist interprets the 3D seismic information. In general terms, interpretation involves deriving a simple plausible geological subterranean model that is compatible with the observed data. This model is never unique, and discovering it involves a sequence of somewhat arbitrary choices.

Despite significant progress in interactive 3D seismic interpretation systems, seismic workstations continue to rely on vertically and horizontally displayed planar slices of recorded data to provide almost all of the "working surfaces" for horizon and fault picking, and correlation. These planar slices provide only a limited perspective of the full three dimensional picture. Often animation of successive slices is required to provide information about the third dimension. However, animation intrinsically forces a three-dimensional interpretation based on the interpreter's memory of the changing picture through time, rather than on direct comparison and correlation of the data.

In observing and interpreting the seismic information displaying in a useful form is highly advantageous. Display systems are widely used in diverse image display applications, with most systems employing either planar or substantially planar display surfaces, i.e., flat wall screens which have an inherently limited field of view. While it is possible to extend the observers field of view by simply increasing the vertical and horizontal dimensions of the planar display screen, this expansion generally results in an unacceptable level of distortion of the image. In order to permit users to view objects peripherally, display technology has been developed which generally uses multiple projectors to project adjoining images on adjacent sections of a large wraparound screen so that observers can view objects with depth perception in 3D space.

Accordingly, four screen types are commonly used today to facilitate the many diverse image display applications. These four screen types are: 1) a flat wall, 2) multiple adjacent flat walls, 3) a dome, and 4) a curved wraparound panel, which can be semi-toroidal. All of these display surfaces can include stereo 3D graphics, and some applications require it to be successful.

The reason that no one screen type has persisted is that the different problems and purposes encountered with display systems are best individually addressed by only one of the various screen types mentioned above.

Accordingly, it is an object of this invention to provide a hybrid screen that combines the four screen types in a unitary structure.

A more specific object is to provide a hybrid screen for viewing various 3D combinations of wraparound, dome, flat wall and multi-wall type displays using a single video projector or multiple video projectors.

A still more specific object of this invention is to provide a portable, self-supporting rigid structure with a concave inner viewing surface, which is suitable for positioning on a desktop or on a moveable support table.

Yet another object is to provide an economical viewing surface that gives the viewer a sense of depth perception without requiring stereo projection and stereo glasses.

It is still another object of this invention to create a truly three-dimensional interactive graphic workstation to aid in geological interpretation of seismic data.

A more specific object of this invention is to visualize spatially correct seismic data on a large concave screen that facilitates horizon and fault mapping of seismic data.

Still another object is to provide a projection system for computer graphic images of seismic data that includes a portable self-supporting rigid screen with a concave inner display surface, which is economical in cost, and includes about fifty times more viewing area compared to conventional seismic workstation monitors.

Another more specific object of this invention is to provide a desk-top-based projection system having a concave screen, and a projector located about nine feet in front of the curved screen for use in interactive desk top viewing environments.

A further object is to provide a projection display system which can be used to view large scale monoscopic as well as stereoscopic color imagery of three-dimensional seismic data.

SUMMARY OF THE INVENTION

While the invention below is described in terms of mapping and projected 3D seismic data, it should be understood that the techniques described herein can be adapted to mapping and projecting 3D data in other fields, such as medical displays, video games and scientific 3D viewing. Accordingly, the invention claimed below should not be construed as limited for use with 3D seismic data.

According to the present invention the foregoing and other objects and advantages are attained in a method and apparatus for extracting, mapping and projecting 3D seismic data to its spatially correct location on a relatively large concave 3D display surface. The method is based on computer software, and involves storing a volume of digitally formatted seismic data in memory of a suitable computer as a first step. A mathematical model is then created corresponding to the shape of the concave 3D display surface, and the mathematical model is inserted in the computer memory so as to at least partially intersect the seismic data volume. The intersecting seismic data is extracted and mapped onto an image plane. Next, the extracted data is processed using digital computational techniques so as to maintain correct spatial position for the varying projector to screen distances associated with the concave 3D display surface, and is then projected onto the concave display surface in its spatially correct dimensions. This means that the displayed seismic data is not a vertical slice of seismic data projected onto a curved screen, but is data carved out of the 3D data volume corresponding to the shape of the concave display surface.

Accordingly, the apparatus of this invention includes a relatively large 3D display surface compared to a typical CRT monitor screen, and which is suitable for positioning on a desk or tabletop. The presently preferred display surface is a multi-section hybrid projection screen structure having a concave display surface for viewing video images. This presently preferred 3D display surface facilitates viewing on four commonly used screen types including: a flat wall, multiple adjacent flat walls, a concave semidome, and a semicylindrical wraparound screen. The various screen types are combined into a single screen referred to herein as a "hybrid" screen, which includes three sections, i.e., a ceiling section which is a concave semidome extending 180 degrees horizontally, and 90 degrees vertically, a semicylindrical lower screen panel, and a flat semicircular floor section. The semidome is elevated above the desktop supported by the cylindrical lower section which is edgewise connected to the semidome. The semicircular floor area completes the display surface. A video projector for displaying the seismic data, which allows the high speed graphic output of a computer system to be projected, enlarged and focused onto a concave screen, is located at a convenient distance from the display surface. Accordingly, computer generated signals control the view to be displayed, and the views include animation of successive images derived from the volume of data to display spatially correct seismic information throughout the data volume.

Also connected to the computer, or parallel computers as the case may be, can be a keyboard, a mouse, two CRT seismic workstation monitors and a relatively small flat auxiliary screen in the shape of a paddle, that can be held by the geophysicist and positioned within the volume inside of the larger concave display.

In a preferred embodiment, the 3D display surface is a unitary construction that combines viewing features of the four commonly used screen types including: a flat wall, multiple adjacent walls, a semidome, and a wraparound. Accordingly, the display surface includes multiple sections for viewing 3D displays. Various combinations of these sections may also be used for viewing, such as the semidome ceiling section together with the flat wall, and, further, the various sections can be divided into subsections or subareas for detailed viewing.

In use, a video projector, which accepts multiple simultaneous inputs, is connected to a computer to allow the graphic output of the computer to be projected, enlarged, and focused onto the hybrid screen. Accordingly, computer generated signals control the view to be displayed, and the views include section or subsection displays, as well as animation of successive views, which imparts lifelike motion to an object and which is derived from the volume of data, to display information from throughout the data volume.

In another preferred embodiment, a relatively small flat auxiliary screen in the shape of a paddle is provided. This paddle screen can be held by the viewer and positioned within the volume inside of the hybrid screen. An electromagnetic transmitter mounted on the outside of the concave screen surface in combination with a receiver mounted on the paddle screen detect the position and orientation of the moveable paddle throughout the space defined within the hybrid screen, and an interactive image is displayed on the paddle, representing the data that exists at the detected spatial position. Thus, the paddle can be used for exploring the volume within the hybrid screen. In simulation displays, the image on the paddle could represent a view corresponding to a rear view mirror. Further, in mining or seismic displays, the paddle can display petrophysical properties of rocks or acoustic waves that are present at that relative position in the interior of the concave display surface.

The method and apparatus of this invention using a large 3D display surface, thus can display a variety of useful views, which are helpful in picking or interpreting seismic horizons and fault segments observed on the surface of the hybrid screen. These views include: 1) a wraparound 180-degree display using only the semicylindrical lower portion of the screen, 2) a 180-degree by 90-degree dome display using the semidome ceiling only, 3) a 1 80-degree wraparound plus floor display using the combination of the semicylindrical lower screen panel and the floor, 4) a single wall or a three-wall display using the semicylindrical lower screen panel divided into three subareas, 5) a single wall plus floor using the combination of a subarea of the semicylindrical lower screen panel and the floor, and 6) a silo with a floor, where the entire concave display surface is illuminated. In addition, the software incorporates real-time navigation through a data volume, and facilitates interactive features including: translate, zoom and rotate. This provides the user with full flexibility to explore the entire data volume, and simplifies quick interactive reconnaissance viewing of the 3D seismic data volume from a variety of viewpoints.

Still other objects and advantages of the present invention will become readily apparent to those skilled in this art from the following detailed description and the drawings, wherein there is shown and described only one of the several preferred embodiments of the invention. While the best mode contemplated for carrying out the invention is illustrated as applied to a particularly shaped concave 3D display surface, it will be realized that the invention is suitable for other and different embodiments such as projecting the spatially correct seismic surfaces, or any other data formatted as a 3D digital volume, onto any desired shaped surface, such as the interior of a hemispherical display surface, the outer surface of a sphere, a corner between walls or a flexible screen curved to a desired shape. Also several details of the invention are subject to modification in various obvious respects, all without departing from the invention. Accordingly, the description of the invention and the drawings are to be regarded as illustrative in nature, and not as restrictive.

BRIEF DESCRIPTION OF THE DRAWINGS

FIG. 7(*c*) is a front elevation of the lower screen panel.

DETAILED DESCRIPTION OF A PREFERRED EMBODIMENT

Referring first to FIGS. 1 through 7(*c*), the illustrated projection display system of the present invention will be described in greater detail hereinbelow. In general, the present projection display system can be used to display images carved out of digital formatted data volumes, whether the data is real, synthetic, or part real and part synthetic, and has obvious utility to many industrial applications in addition to seismic visualization and interpretation, including but not limited to:

1) manufacturing design reviews,
2) ergonomic simulation,
3) safety and training,
4) video games,
5) cinematography,
6) scientific 3D viewing, and
7) medical displays.

The invention, however, will be illustrated with reference to projecting seismic data on a hybrid screen. Suitable computer software techniques for generating seismic displays of spatially correct dimensions on a large 3D display surface, and for driving a video projector with computer generated signals will be more fully explained hereinafter.

Figure 1:
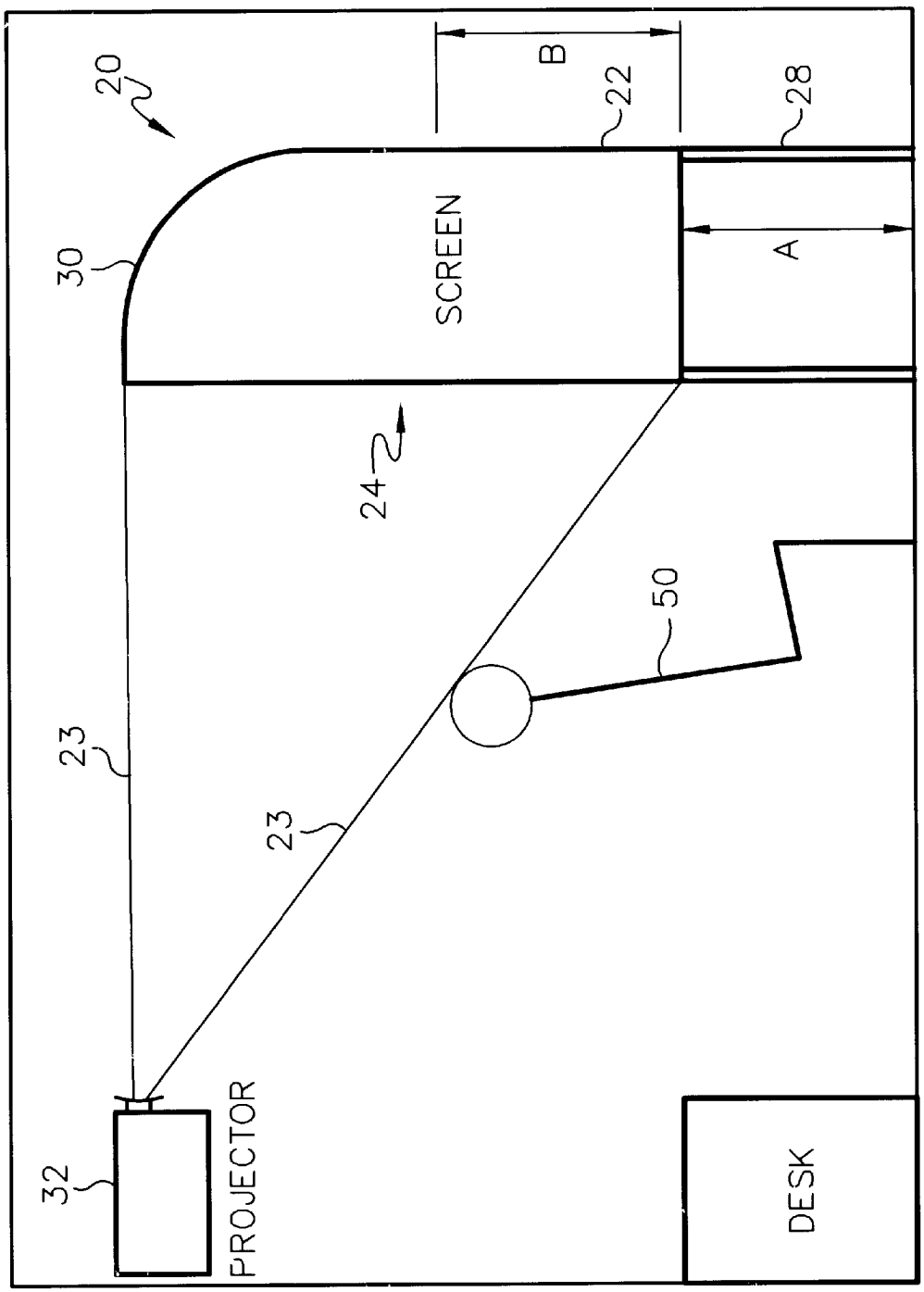
FIG. 1 is a schematic elevation side view of a video projection system located in an average sized domestic room, showing the full projection ray viewing volume according to this invention.
Figure 2:
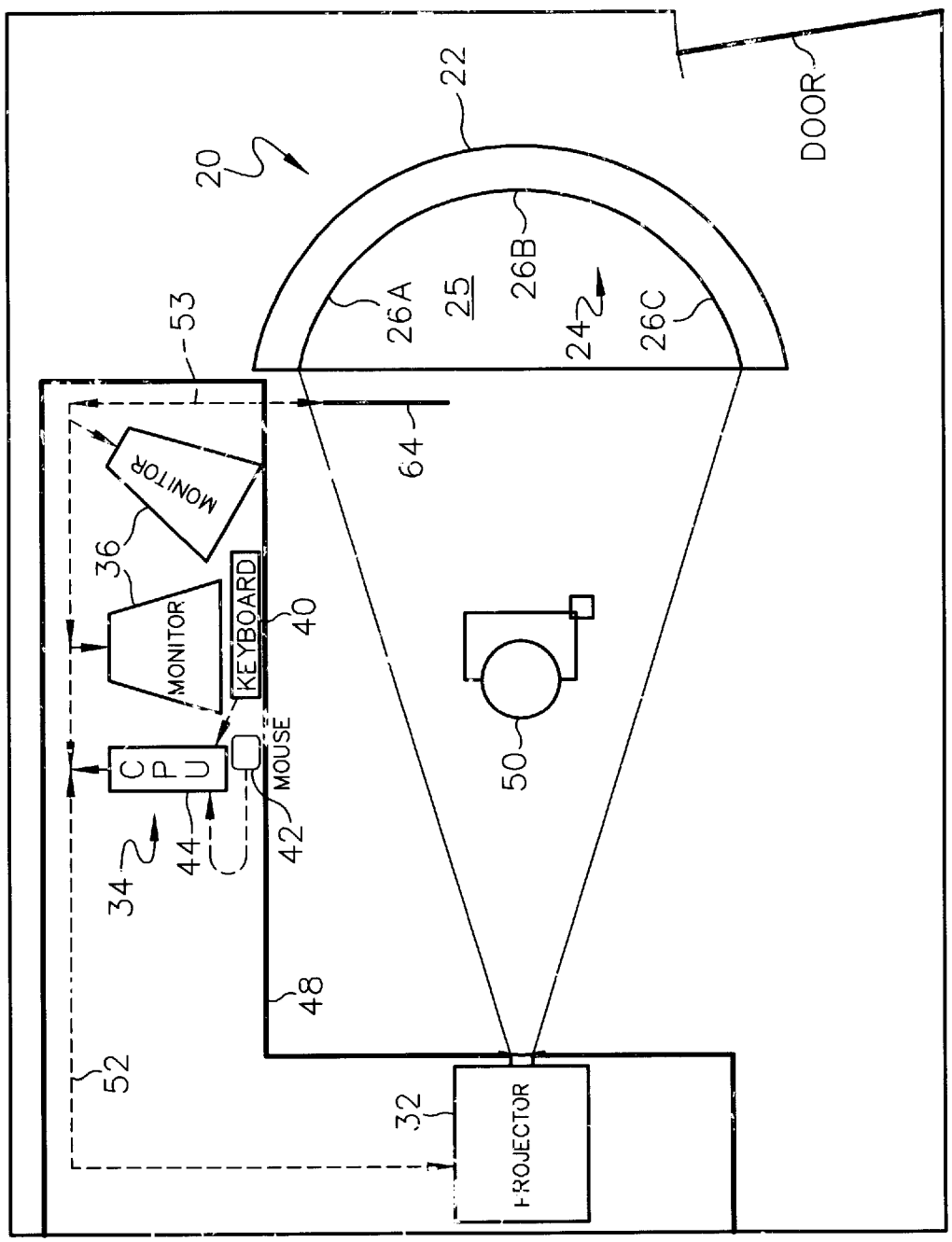
FIG. 2 is a schematic plan view of the video projection system located in the room illustrated in FIG. 1, and showing an arrangement of computer, projector and related digital equipment.

As best shown in FIGS. 1 and 2, the projection display system has several major components, i.e.: a 3D structure for displaying images generally indicated at 20, and referred to herein as a hybrid screen, one or more image projectors 32 for projecting color images onto the hybrid screen, and an associated computer system generally shown at 34 for generating video images.

The presently preferred hybrid screen 20 is of compact unitary construction having three sections forming a generally concave display surface, the sections include: a concave semidome ceiling section 30; a semicylindrical lower section 22, and a flat semicircular floor section 25. The cylindrical screen section 22, which is also illustrated in FIG. 7(*c*), is edgewise mounted to a lower edge of the semidome 30. Projection rays illustrated by lines 23 indicate the limits of the viewing volume of the full screen 20. It is noted, however, that the viewing volume may be adjusted to illuminate only desired sections or subareas of the full screen. The concave display surface of the hybrid screen 20 is generally indicated at 24, and includes the semidome section 30, which is elevated above the desk 28 by edgewise mounting on the semicylindrical screen section 22. Also as illustrated in FIG. 2 the cylindrical screen section 22 includes left, central and right subarea display surfaces 26A, 26B and 26C respectively, such that three independent wall views can be simultaneously displayed on the three designated subareas. Still referring to FIGS. 1 and 2, the lower edge of the semicylindrical display screen 22 is attached to flat semicircular floor section 25; thus, supporting the semidome section above the desk 28.

Any suitable material for receiving an image can be used for the construction of the hybrid screen. Readily available materials such as wood, foam board, fiberglass or molded plastic are presently preferred for the construction of the hybrid screen. In the illustrated preferred embodiment, the size of the hybrid screen with reference to the letters A and B in FIG. 1; C, D, and E in FIG. 3; F and G in FIG. 7(b) are shown in Table 1 below:

TABLE 1

Typical Hybrid Screen Dimensions

| A   | B   | C   | D     | E   | F   | G  |
|-----|-----|-----|-------|-----|-----|----|
| 27" | 24" | 31" | 55¾"  | 72" | 30" | 6" |

The video projector 32 can be positioned at any suitable distance from the screen 20 to illuminate the full interior surface, or various subareas of the full surface, and is preferably wall mounted as shown in FIGS. 1 and 2. A preferred distance from the video projector to the above mentioned hybrid screen is about nine feet, such that, if desired, the projection system is suitable for viewing in a relatively small room. The projection system, however, can be expanded for viewing in larger rooms. A commercially available computer workstation compatible projector 32 having high brightness and resolution that is suitable for use with the present invention is a model called Impression 1280, from a company called ASK, in Fredrikstad, Norway.

A suitable computer having a texture mapping graphic system with fast image generation, which can be programmed for carrying out the method of this invention, is a model called Octane available from Silicon Graphics Inc., Mountain View, Calif.

Referring specifically now to FIG. 2, an arrangement of the major components of the invention are illustrated. In FIG. 2, the computer system 34, which includes two workstation monitors 36, a keyboard 40, a mouse 42, and the computer 44, is positioned on a desktop 48. The hybrid screen 20 is also positioned on a desktop. As previously mentioned, the video projector 32 is preferably wall mounted a convenient distance from the hybrid screen 20, and is connected to the computer system 34 via cable 52. A user of the projection system is illustrated at 50.

Figure 3:
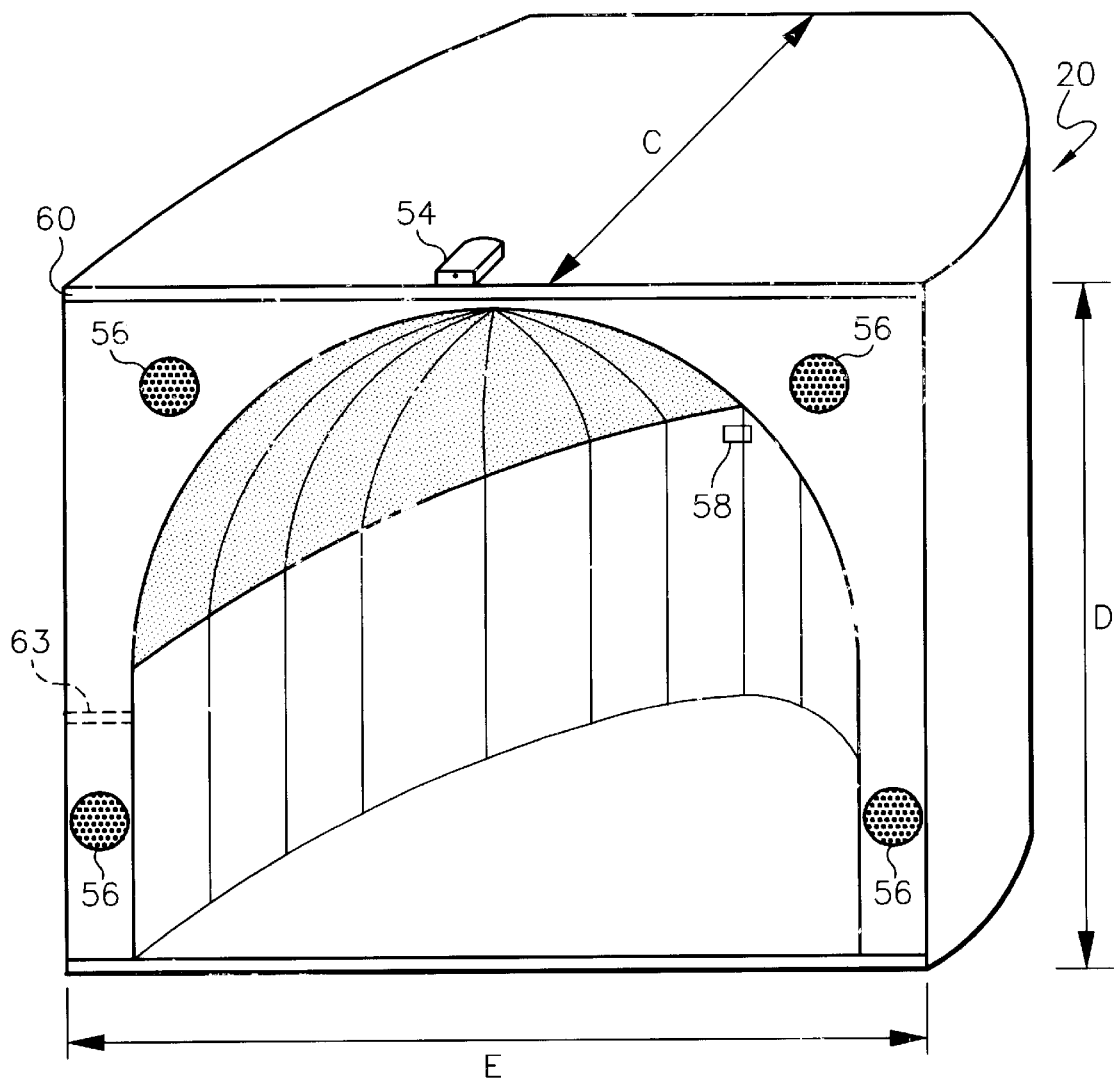
FIG. 3 is a perspective view of the hybrid screen.

FIG. 3 is a perspective view of the hybrid screen 20, and additionally illustrates a stereo emitter 54, four audio speakers 56, and an electromagnetic transmitter 58, all of which can be used with the present invention. Also illustrated is the position of horizontal support members 60 and 63 for the semidome section. Use of the stereo emitter, which is connected directly to the computer 44, is an option for viewing with the projection system, and requires battery powered glasses to detect an infrared signal from the emitter 54. A suitable emitter is a model ESGI, available from a company called StereoGraphics, San Rafael, Calif.

Additional information can be supplied to the seismic interpreter with four audio speakers. For example, as specific seismic attribute values change in the data volume, the pitch or amplitude of the audio tones can change accordingly. Using stereo or quad audio will also allow locating the sound source corresponding to the appropriate data area. Still further, multiple attributes may be compared by using different audio frequencies for different attributes, and this could create easily recognizable audio interference responses.

Figure 4:
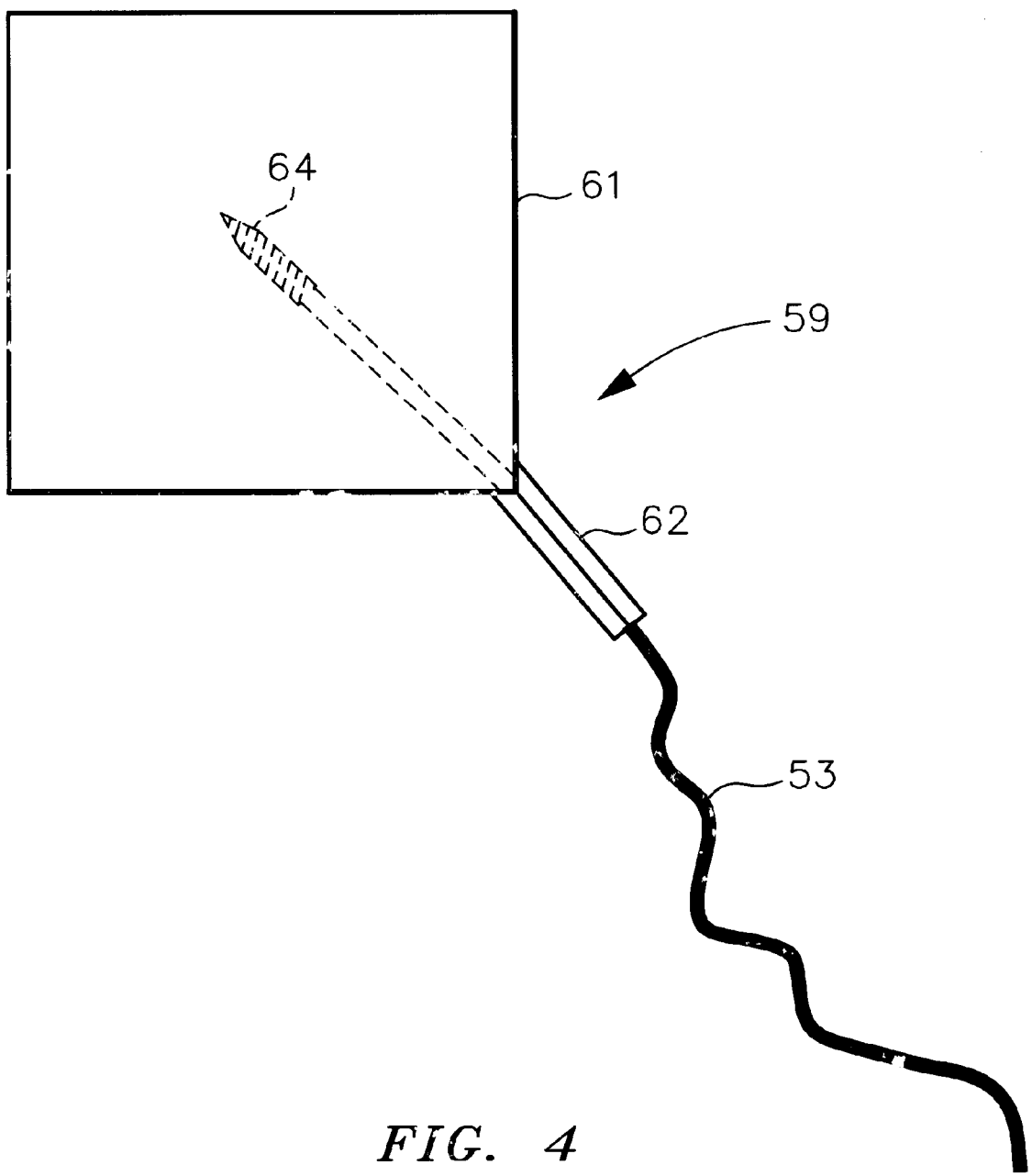
FIG. 4 is a schematic view of the auxiliary paddle screen.

Referring now to FIG. 4, there is illustrated a schematic view of the auxiliary paddle screen 59, which as previously mentioned can be interactively positioned to probe the space within the hybrid screen. The viewing surface of the paddle 61 is approximately one-foot square and can include other shapes like a circle or oval attached to a handle 62. A tracking device, such as electromagnetic receiver 64, is mounted on the back side of the paddle screen. The receiver 64 cooperates with the transmitter 58, which is mounted on the hybrid screen as shown in FIG. 3 to detect the position and orientation of the paddle screen 59 within the viewing volume of the hybrid screen 20. The electromagnetic receiver 64 is connected to the computer via cable 53 either by direct connection or by interface through a system electronics unit. If a system electronics unit is utilized, it will generally contain the hardware and software necessary to receive information from the transmitter and receiver, compute position and orientation and interface with the computer. Suitable location detectors for tracking the position of the paddle screen, such as the electromagnetic transmitter 58 and receiver 64, are commercially available from a company called Polhemus, located in Colchester, Vt. Location detectors are disclosed in U.S. Pat. Nos. 3,982,474; 5,453,686; and 5,307,072.

Instead of the electromagnetic transmitter and receiver described above, other suitable tracking systems may be used to determine the position and/or orientation of the paddle screen. Other suitable systems include acoustical detection methods, optical detection methods, flexible ribbon tracking systems that utilize fiber optic sensors such as 3-D Shape Tape™ tracker by Measurand Inc.; DC magnetic field tracking devices such as mini Bird tracker by Ascension Technology Corporation; and SpacePad® tracker by Ascension Technology Corporation.

Figure 5A:
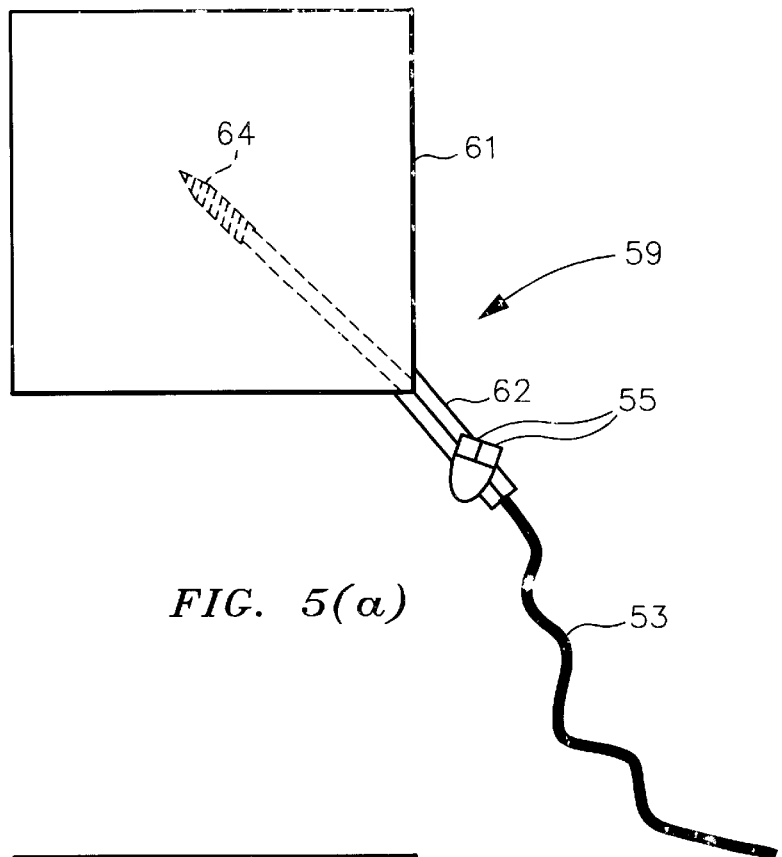
FIGS. 5(*a*)–5(*b*) are schematic views showing alternative embodiments of the auxiliary paddle screen.

Referring now to FIG. 5(a), there is illustrated a schematic view of an auxiliary paddle screen 59 which has a mouse 57 incorporated into handle 62. By depressing buttons 55 it is possible to pick or select at least a portion of the image displayed on the viewing surface of the paddle 61. Accordingly, in 3D seismic images it is possible to select faults, horizons or any geometric outline in 3D space by moving the paddle and then depressing a button 55 when the object of interest appears on the viewing surface of paddle 61.

Figure 5B:
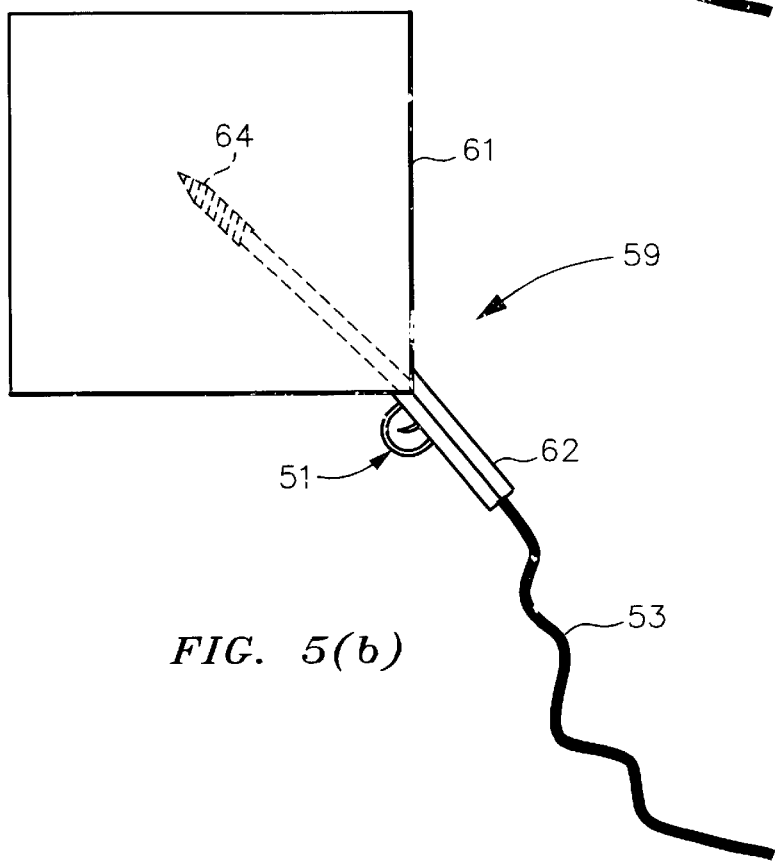

FIG. 5(b) represents an alternative embodiment where a trigger 51 is incorporated onto handle 62. Images are selected by squeezing trigger 51 when the object of interest appears on the viewing surface 61.

Figure 6:
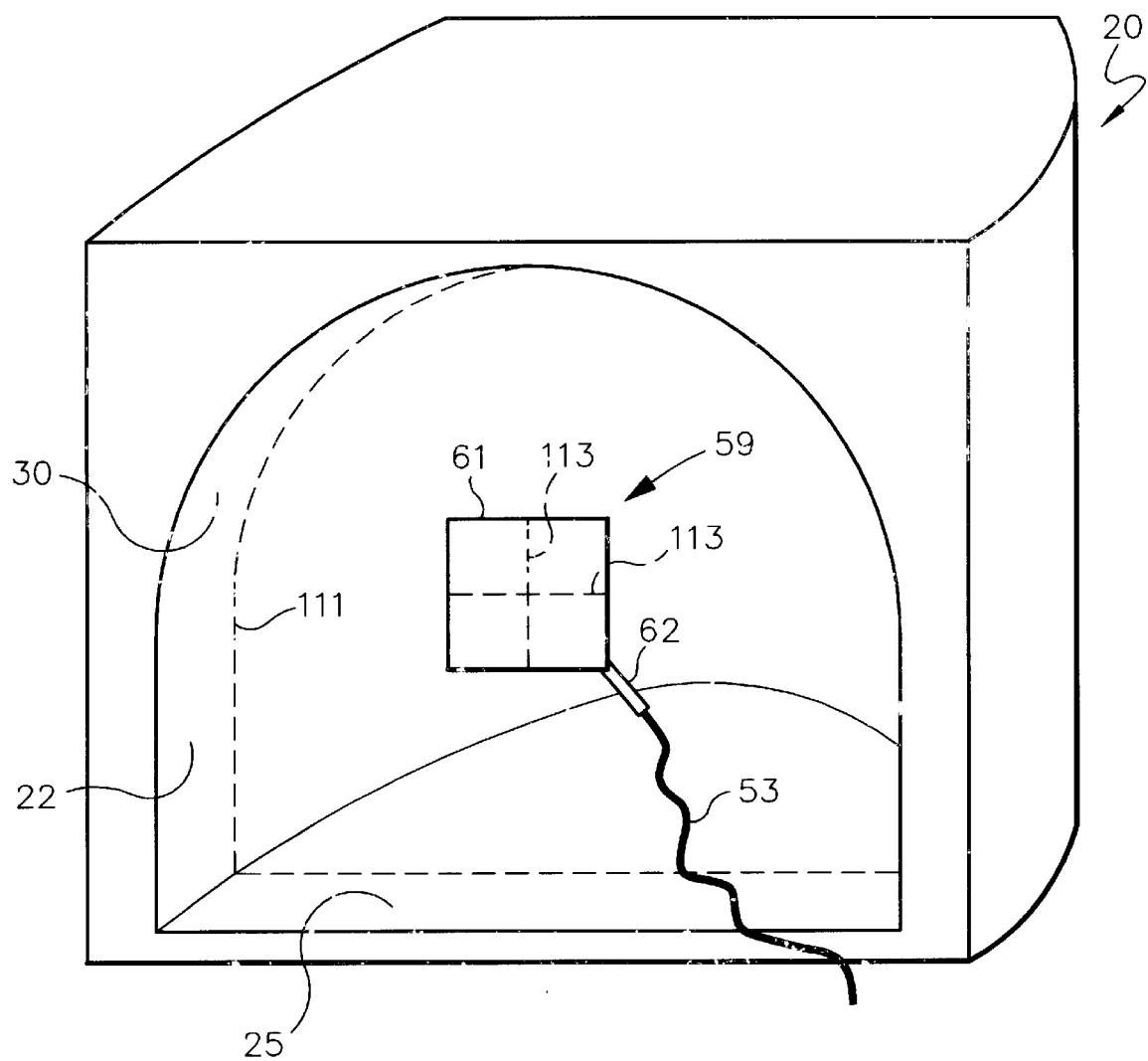
FIG. 6 is a perspective view of the hybrid screen with the auxiliary paddle screen in use.

Referring now to FIG. 6, a perspective view of the hybrid screen with the auxiliary paddle screen 59 in use is shown. The viewing surface 61 is in the plane defined by dashed line 111 and displays an image corresponding to the 3D seismic data for its location within the plane defined by dashed line 111. If desired, the image appearing on the viewing surface 61 can be displayed with crosshairs 113. The crosshairs are especially useful when utilizing an auxiliary paddle screen 59 in accordance with the embodiments illustrated in FIGS. 5(a) and 5(b). In such embodiments the intersection of the crosshairs indicates the point of selection for the image.

Figure 7A:
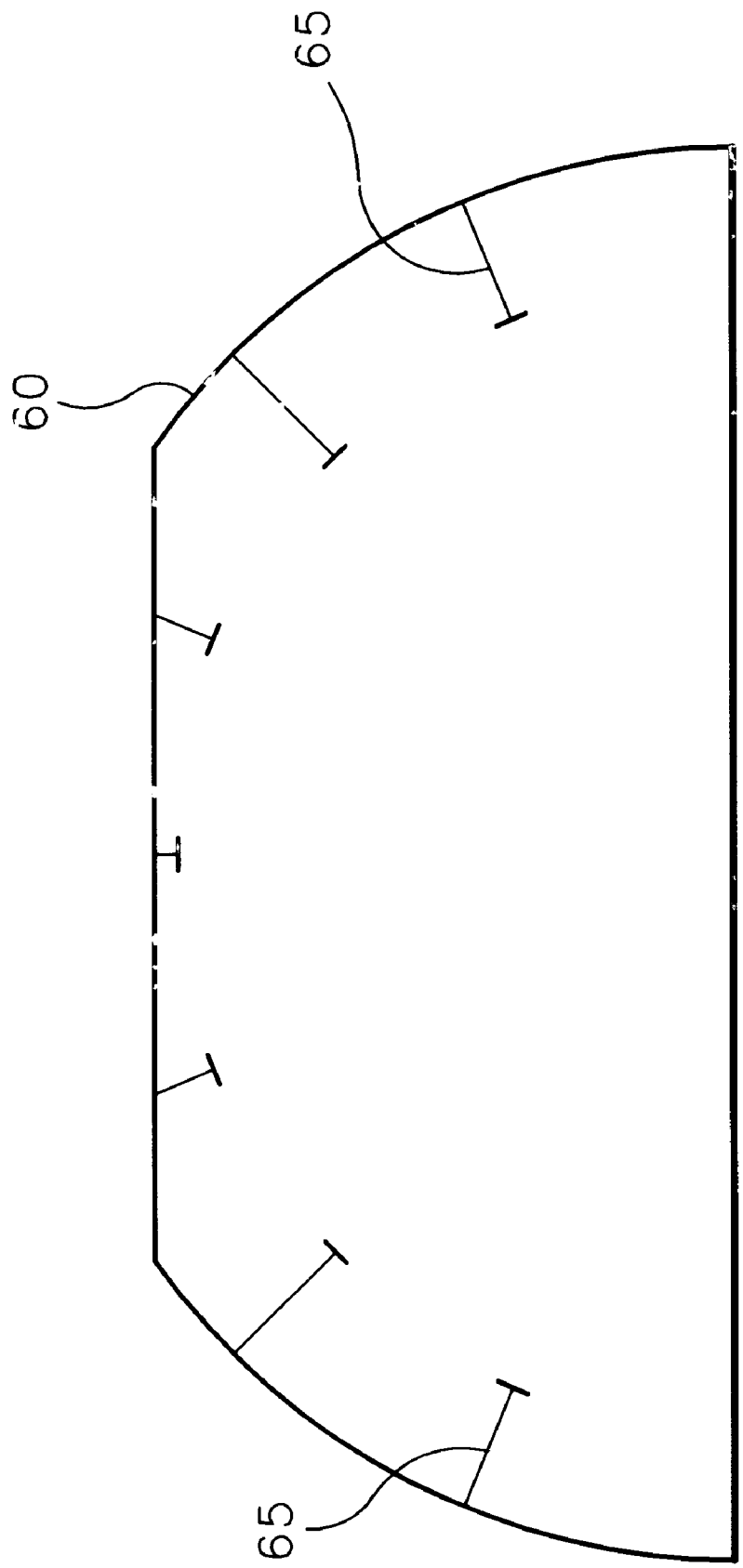
FIGS. 7(*a*)–7(*b*) are plan views showing top and lower horizontal support members respectively for the semidome of the hybrid screen.
Figure 7C:
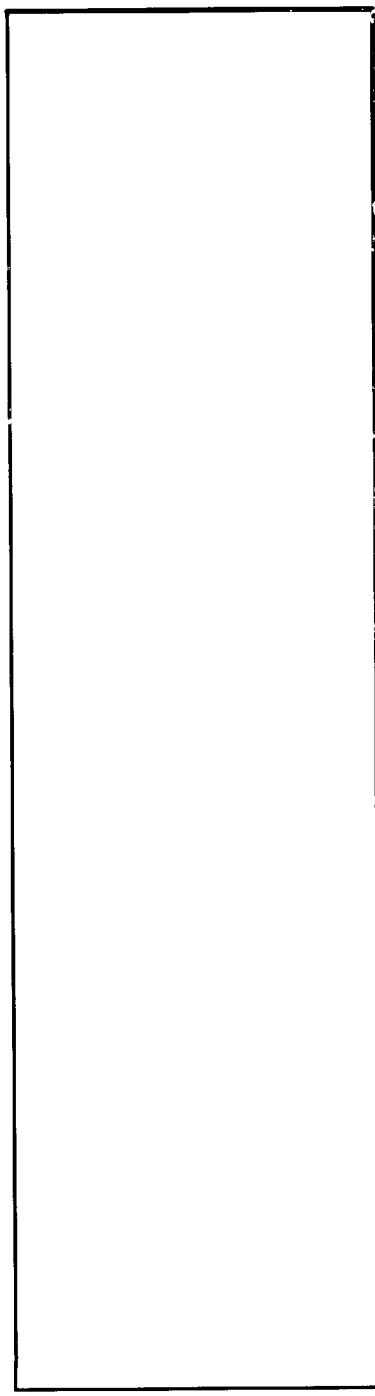
Figure 7B:
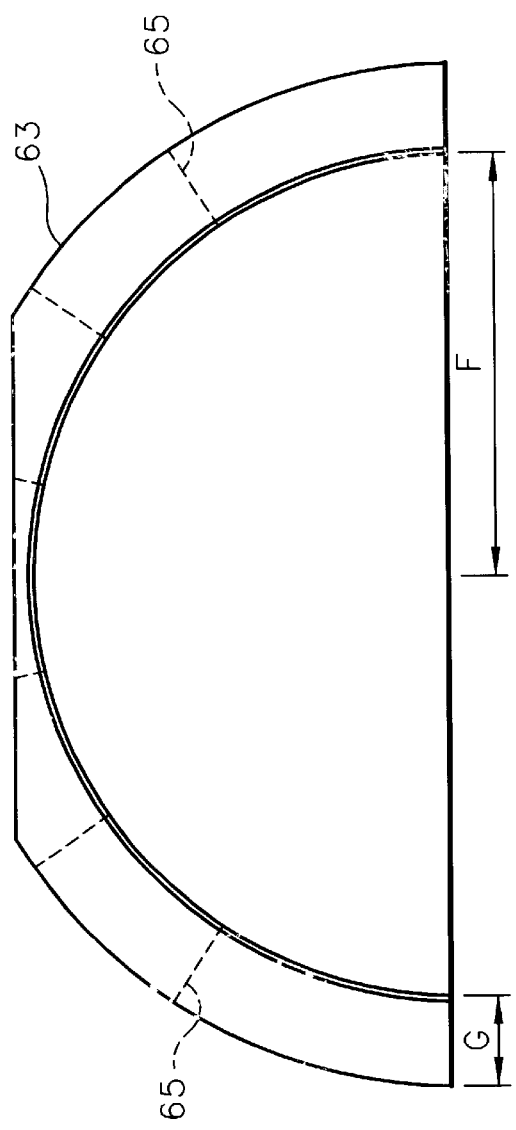

FIGS. 7(a) and 7(b) illustrate the shape of horizontal structural members 60 and 63 of the hybrid screen 20, which are positioned as shown in FIG. 3, and further shows the location of vertically mounted rib type structure members 65, which in turn support triangular shaped dome panels, not illustrated, that form the semidome concave viewing surface. While structural support members 60 and 63 are useful to provide structural support, it is presently preferred to mold a one piece plastic hybrid screen which does not utilize structural support members 60 and 63.

A 3D graphical hardware and software system for fast image generation will now be described in more detail beginning with reference to FIG. 8, where there is illustrated a simplified computer flow diagram showing the major steps in the method for displaying spatially correct seismic data onto a hybrid screen or a paddle screen according to this invention. The first step 66 is to store in computer memory a set of seismic data in the form of digitized seismic signal traces, which are to be visualized and/or interpreted, to provide the 3D seismic data volume. The next step 68 is to select a desired flat or concave shape for the seismic display of subsurface structure. Using the hybrid screen with appropriate extraction and projection operations, the display could correctly display data on a flat wall, a wraparound, or various combinations of flat walls, with or without a floor or a dome shaped ceiling. Selecting the combination of a semidome ceiling, a cylindrical lower section, and floor will illuminate the entire concave display surface of the hybrid screen. The program then proceeds to create a mathematical model corresponding to the shape of the selected display surface, and inserts the model into computer memory so as to at least partially intersect the 3D seismic data volume as illustrated at step 70. In step 72 the seismic data intersecting the mathematical model is extracted and mapped onto the surface of a two dimensional image plane. Next, in step 74 video images of the seismic data mapped onto the image plane in step 72 are transferred to a video display buffer using well known texture mapping techniques. Finally, in step 76 the image formed in the video display buffer is projected onto the selected 3D display surface.

Figure 8:
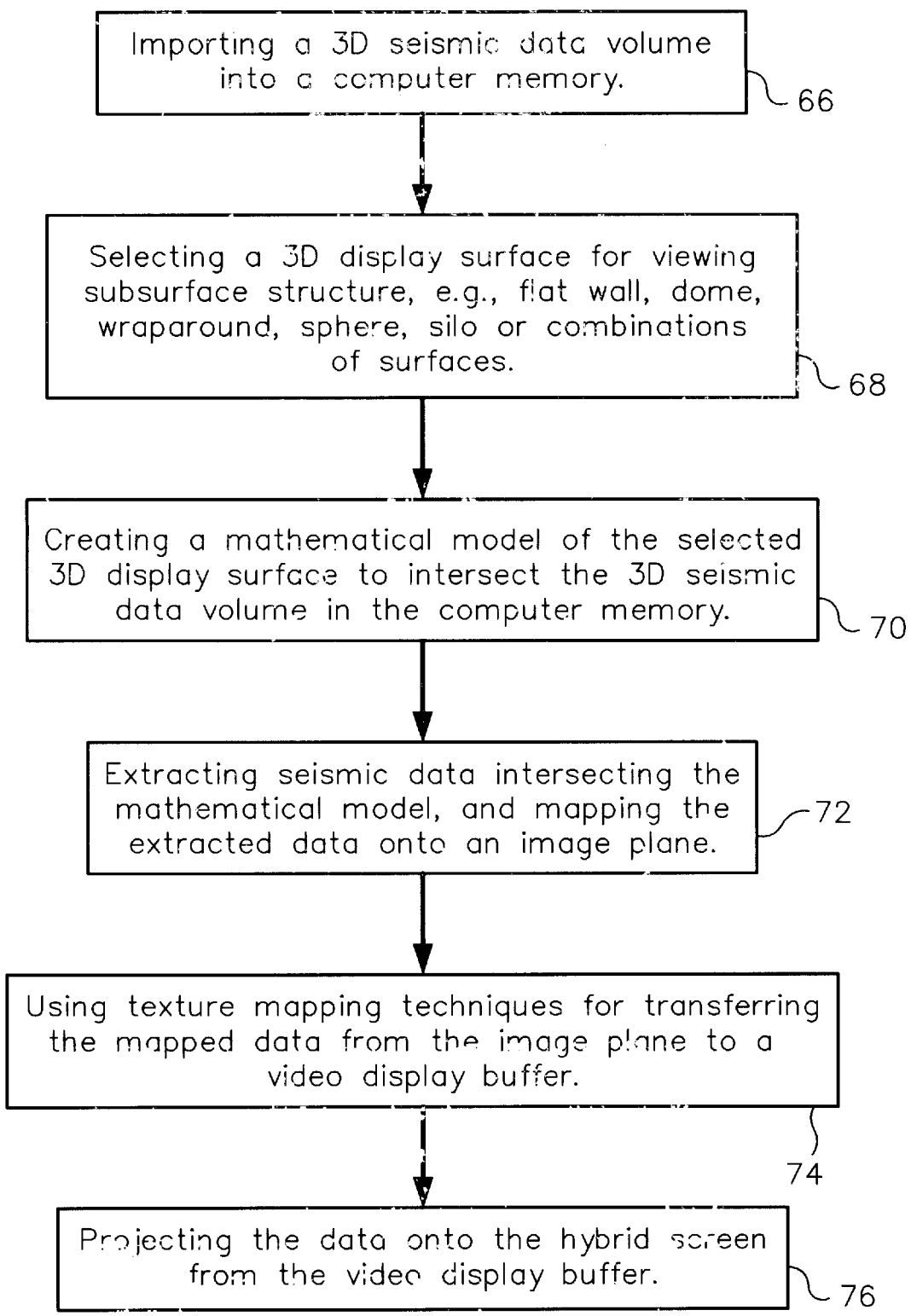
FIG. 8 is a simplified computer flow diagram showing the major steps of the method for displaying spatially correct seismic data according to this invention.
Figure 9:
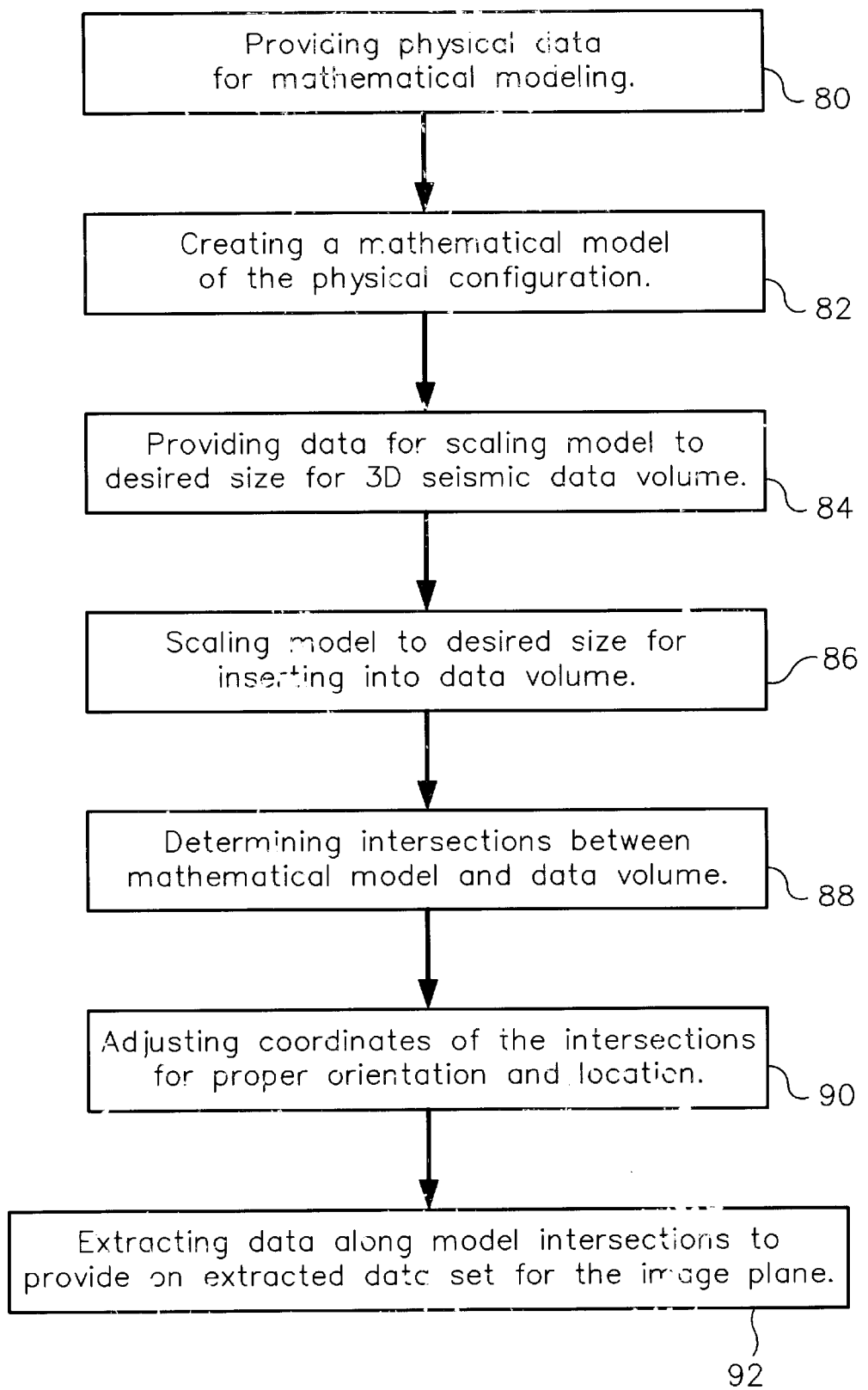
FIG. 9 is a computer flow diagram showing steps. for extracting data intersecting the display surface from the 3D seismic data volume.

Referring now to FIG. 9, there is illustrated a computer flow diagram showing more details of the step 70 in FIG. 8 for creating a mathematical model of the selected 3D display surface. As a first step 80 in FIG. 9, the computer program is provided with physical data relating to the desired dimensions of the surface to be modeled, and a selected reference point within the modeled space. The program then proceeds to step 82 for creating the mathematical model of the physical configuration. This mathematical model is one or more algebraic equations describing the locus of all points on the surface to be modeled, and usually involves combinations of known solid 3D shapes such as a plane, a cylinder, a sphere etc. If more than one solid shape is required to describe this surface, multiple equations are used, which in combination can describe a full 3D concave display surface. For example, the previously mentioned hybrid screen can be modeled using the combination of equations describing a sphere, a cylinder and a plane. In step 84, additional data is provided to the computer program for scaling the model with reference to the data volume, including at least a specified size and target point for the model. In step 86 the mathematical model is scaled to a desired size. Next in step 88 the intersections between the mathematical model and the data volume are determined and, in step 90, the coordinates of the intersections can be adjusted for a specified orientation and location. Finally, in step 92, an extracted data set is obtained for mapping data onto the image plane.

Figure 10:
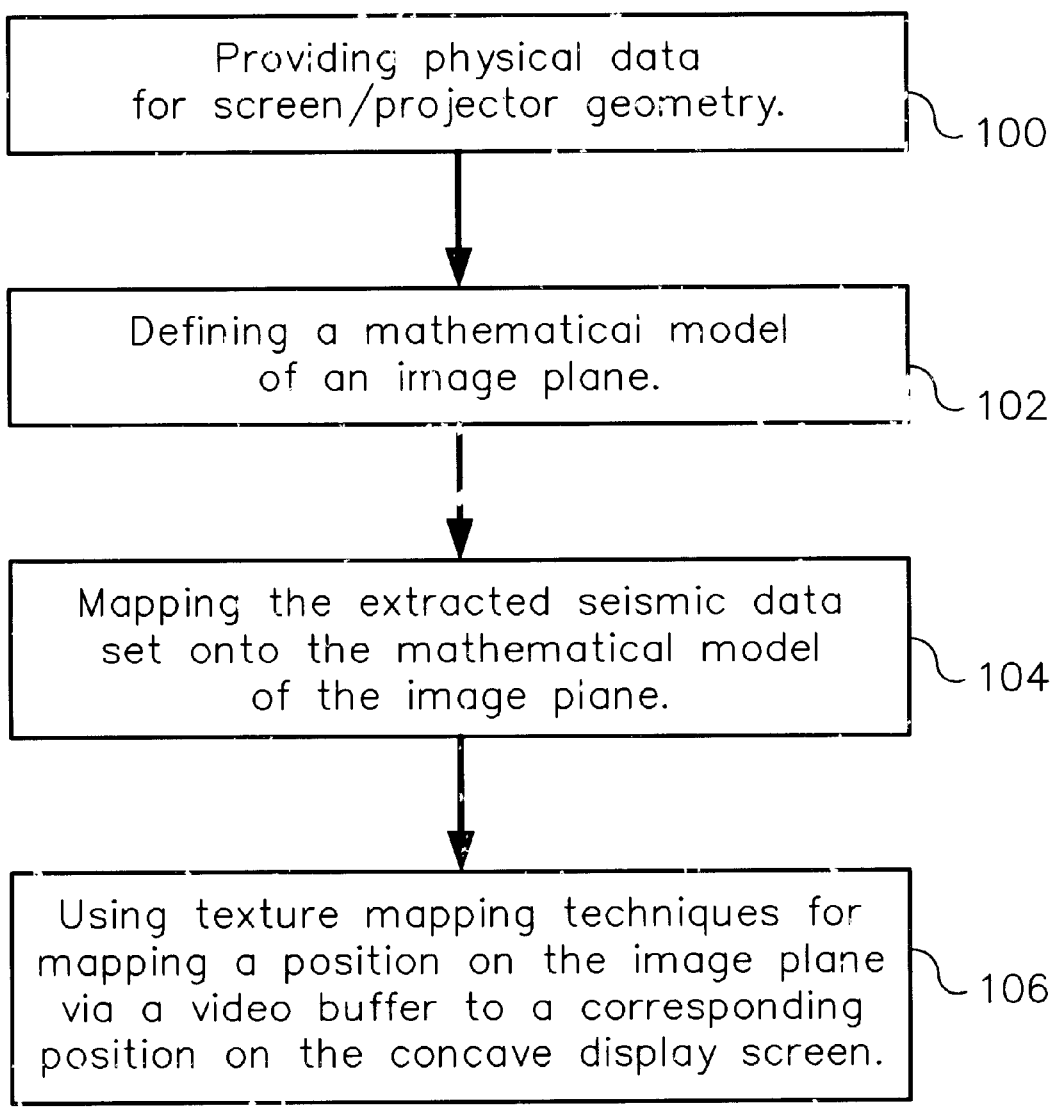
FIG. 10 is a computer flow diagram showing steps for mapping extracted seismic data onto an image plane assumed to be located in the ray projection volume between the projector and hybrid screen.

Referring now to FIG. 10, there is illustrated a computer flow diagram showing more details of steps 72 and 74 of FIG. 8 relating to mapping the extracted data and then displaying the mapped data. In step 100 the computer program is provided with data relating to screen/projector geometry including focal distances, desired ray projection volume, and dimensions of the display surface. Proceeding to step 102, a mathematical model of an image plane is defined and the extracted data is mapped onto the image plane in step 104 thus producing a mapped data set. From the image plane the mapped seismic data set is projected onto a concave 3D display screen, via a video image buffer, preferably using texture mapping techniques, although other known techniques may be used.

Various techniques for texture mapping are well known to those skilled in the field of computer graphics, and these texture mapping techniques are generally used to improve surface details of displayed images. Surface detail attributes commonly texture mapped include color, reflection, transparency, shadows, surface irregularities such as bumps or scratches, etc. In general, the texture mapping process effects mapping of a position on one plane onto a corresponding position of another plane and is suitable for transferring the mapped seismic data from the image plane to the video image buffer, which can then be projected onto the display surface. For further discussion of texture mapping and a survey of applications see, e.g., Haeberli, et al., Silicon Graphics Computer Systems, "Texture Mapping as a Fundamental Drawing Primitive", Proc. fourth Eurographics Workshop in Rendering, Paris, France, Jun., 1993, pgs. 259–266.

Other techniques well known to those skilled in computer graphic arts are also suitable for projecting the computer graphic images, such as direct pixel mapping, which employs a one-to-one correspondence between the computer memory and the useable pixel positions on the screen.

Figure 11:
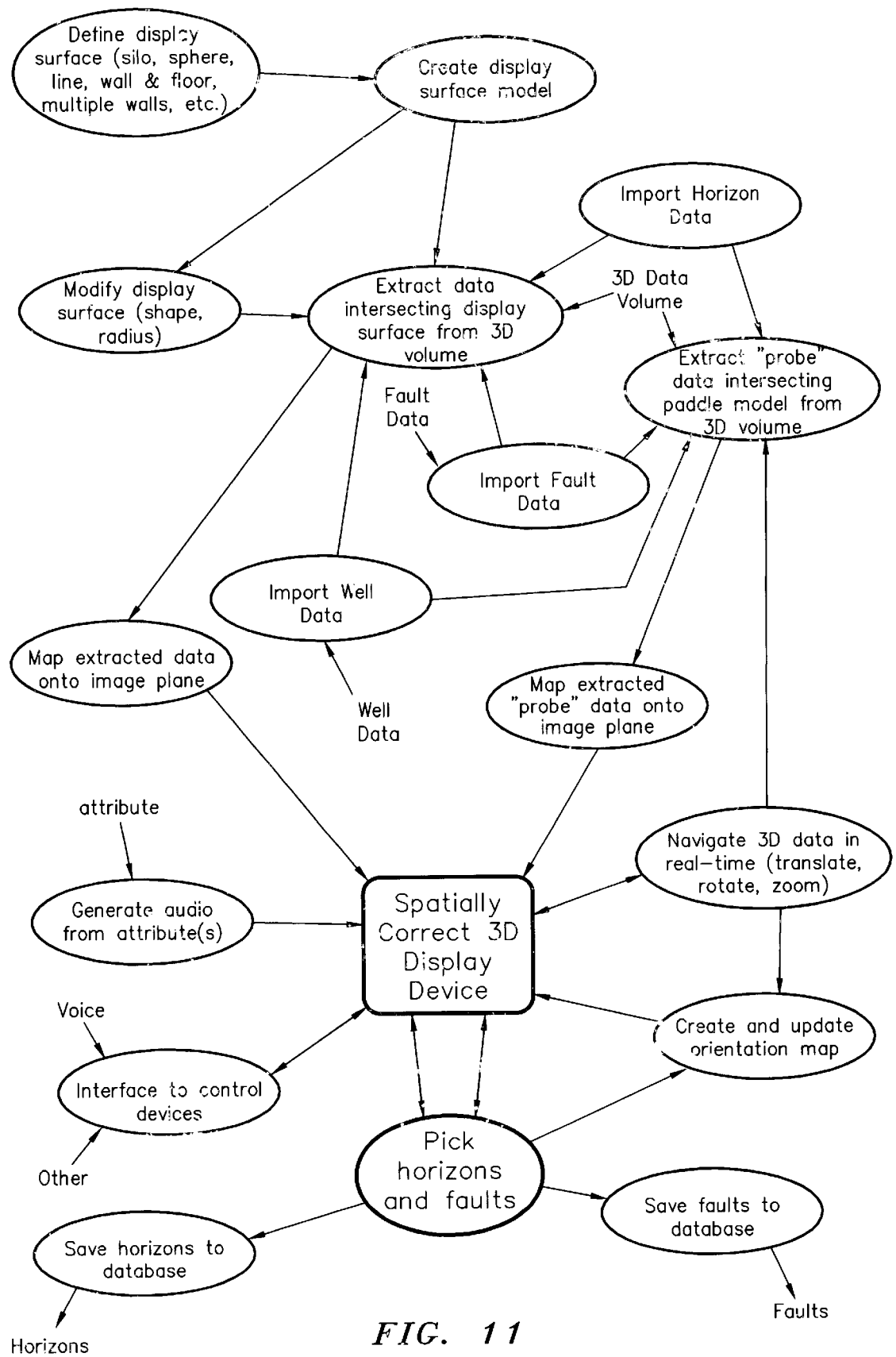
FIG. 11 is a detailed block diagram showing the overall organization of data input and processing steps for displaying spatially correct 3D seismic data on a concave display device according to this invention.

Referring now to FIG. 11, there is presented a block diagram illustrating the overall organization of external data input and processing steps for displaying spatially correct seismic data on a concave display device according to this invention. In FIG. 11, the processing steps, which have been previously discussed with reference to FIGS. 8, 9 and 10, are encircled, the external data inputs are shown as labeled arrows entering a processing step and includes optional data such as well data, fault data, horizon data, attribute data and voice data. The display screen is shown in a square in the lower center of the figure.

It will be recognized that the above described invention may be embodied in other specific forms without departing from the spirit or essential characteristics of the disclosure. Thus, it is to be understood that the invention is not limited by the foregoing illustrative details, but rather is to be defined by the appended claims.

That which is claimed is:

1. A multi-section hybrid projection screen positionable on a desktop, said hybrid screen having a concave three-dimensional (3D) viewing surface for receiving focused images projected on said concave surface, said hybrid screen comprising:

a) a concave semidome ceiling section;

b) a flat semicircular floor section having a diameter matching the maximum diameter of said semidome; and c) a semicylindrical wall section having a diameter matching the maximum diameter of said semidome, said wall section being edgewise joined between said ceiling section and said floor section to form a continuous concave viewing surface with said ceiling section and said wall section, wherein said ceiling section is supported above said desktop when said floor section is positioned on said desktop, and wherein said multi-section hybrid screen displays images projected on at least a subsection of said hybrid screen;

d) a moveable paddle screen; and e) a tracking system for detecting the position of said paddle screen relative to an image displayed on said hybrid screen and wherein said paddle screen displays images projected on it in accordance with its position.

2. A multi-section hybrid projection screen in accordance with claim 1, wherein said paddle screen further includes a button by which portions of said image projected on the paddle screen can be selected.

3. A multi-section hybrid projection screen in accordance with claim 1, wherein said tracking system comprises an electromagnetic transmitter and receiver associated with said paddle screen.

4. A multi-section hybrid projection screen in accordance with claim 3, wherein said electromagnetic transmitter is mounted on the outside of said hybrid screen, and said electromagnetic receiver is mounted on the back side of said paddle screen.

5. A multi-section hybrid projection screen in accordance with claim 1, wherein said tracking system detects both the position and orientation of said paddle relative to said image displayed on said hybrid screen.

6. A multi-section hybrid projection screen in accordance with claim 5, wherein said tracking system comprises an electromagnetic transmitter mounted on the outside of said hybrid screen, an electromagnetic receiver mounted on the back side of said paddle screen, and said paddle screen further includes a button by which portions of the image projected on said paddle screen can be selected.

7. A paddle screen comprising:

a) a viewing surface for displaying projected images;

b) a handle connected to said viewing surface; and c) a tracking system for detecting the position of said viewing surface and wherein said paddle screen displays images projected on it in accordance with its position.

8. A paddle screen in accordance with claim 7 further comprising a button by which portions of an image projected on the paddle screen can be selected.

9. A paddle screen in accordance with claim 7 wherein said tracking system detects both the position and orientation of said paddle and wherein said paddle screen displays images projected on it in accordance with its position and orientation.

10. A paddle screen in accordance with claim 9 further comprising a button by which portions of an image projected on said paddle screen can be selected.

11. A method comprising:

a) projecting a first image onto a first screen; and b) projecting a second image onto a second screen based on said second screen's position in relation to said first screen.

12. A method according to claim 11 wherein said second image is projected onto said second screen based on said second screen's position and orientation.

13. A method according to claim 11 further comprising selecting at least a portion of said second image.

14. A method according to claim 11 wherein said first image is a three dimensional (3D) computer graphic image and said first image and said first screen correspond, so that when said first image is projected onto said first screen, the first image is spatially correct.

15. A method according to claim 11 wherein said first screen is a concave three-dimensional (3D) viewing surface.

16. A method according to claim 15 wherein the first image corresponds to said concave viewing surface of said first screen such that it is in correct 3D spatial relation.

17. A method according to claim 16 wherein the second screen is smaller than the first screen and moveable throughout the space defined by said concave viewing surface and said second image correlates spatially with the position of the paddle within said concave viewing surface and with the first image.

18. A method according to claim 17 wherein said second image is projected onto said second screen based on said second screen's position and orientation.

19. A method according to claim 17 further comprising selecting at least a portion of said second image by utilizing buttons attached to said second screen.

20. A method according to claim 17 wherein said second image is projected onto said second screen based on said second screens position and orientation and further comprising selecting at least a portion of said second image by utilizing buttons attached to said second screen.

* * * * *